(12) United States Patent
Yamaguchi et al.

(10) Patent No.: US 6,908,149 B1
(45) Date of Patent: Jun. 21, 2005

(54) ANTI-SUBMARINE VEHICLE SEAT DEVICE

(75) Inventors: Hiroyoshi Yamaguchi, Yokohama (JP); Hajime Shono, Yokohama (JP)

(73) Assignee: NKH Spring Co., Ltd., Kanagawa-ken (JP)

( * ) Notice: Subject to any disclaimer, the term of this patent is extended or adjusted under 35 U.S.C. 154(b) by 472 days.

(21) Appl. No.: 09/526,405

(22) Filed: Mar. 15, 2000

(30) Foreign Application Priority Data

| Mar. 15, 1999 | (JP) | ............................................. 11-067669 |
| Mar. 15, 1999 | (JP) | ............................................. 11-068356 |
| Mar. 26, 1999 | (JP) | ............................................. 11-082799 |
| Mar. 26, 1999 | (JP) | ............................................. 11-082802 |

(51) Int. Cl.[7] ............................................. B60N 2/42
(52) U.S. Cl. .............................. 297/216.1; 297/284.11
(58) Field of Search ........................ 297/216.1, 284.11

(56) References Cited

U.S. PATENT DOCUMENTS

| 3,591,232 A |   | 7/1971  | Simon ..................... 297/216.1 |
| 3,858,930 A |   | 1/1975  | Calandra et al. ............ 296/68.1 |
| 4,589,696 A | * | 5/1986  | Kanai et al. ............ 297/284.11 |
| 4,623,192 A |   | 11/1986 | Koide et al. ......... 297/284.11 X |
| 4,652,049 A |   | 3/1987  | Maruyama et al. . 297/284.11 X |
| 4,705,296 A |   | 11/1987 | Andersson et al. ......... 280/806 |
| 5,186,494 A |   | 2/1993  | Shimose ..................... 280/806 |
| 5,340,185 A |   | 8/1994  | Vollmer ..................... 296/68.1 |
| 5,374,105 A |   | 12/1994 | Kracht et al. ............. 297/216.1 |
| 5,403,037 A |   | 4/1995  | Föhl ........................... 280/806 |
| 5,405,180 A |   | 4/1995  | Föhl ........................... 297/478 |
| 5,449,214 A |   | 9/1995  | Totani ........................ 296/68.1 |
| 5,451,094 A |   | 9/1995  | Templin et al. |
| 5,490,706 A |   | 2/1996  | Totani ........................ 296/68.1 |
| 5,556,159 A | * | 9/1996  | Canteleux ................ 297/216.1 |
| 5,556,160 A |   | 9/1996  | Mikami ................... 297/216.1 |
| 5,695,242 A |   | 12/1997 | Brantman et al. ....... 297/216.1 |
| 5,908,219 A |   | 6/1999  | Böhmler .............. 297/216.1 X |
| 6,048,034 A | * | 4/2000  | Aumont et al. .......... 297/216.1 |
| 6,050,635 A | * | 4/2000  | Pajon et al. ......... 297/216.1 X |
| 6,113,185 A |   | 9/2000  | Yamaguchi et al. ..... 297/216.1 |

FOREIGN PATENT DOCUMENTS

| EP | 0 306 299 A1 | 3/1989 |
| GB | 2330334 A | 4/1999 |
| GB | 2337726 A | 12/1999 |
| GB | 2342076 A | 4/2000 |
| JP | 58-53525 | 3/1983 |
| JP | 2-149328 | 12/1990 |
| JP | 3-61440 | 6/1991 |
| JP | 3-227745 | 10/1991 |
| JP | 3-121947 | 12/1991 |
| JP | 4-93222 | 8/1992 |
| JP | 5-229378 | 9/1993 |
| JP | 7-81466 | 3/1995 |
| JP | 10-181529 | 7/1998 |

OTHER PUBLICATIONS

English Language Abstract of Japanese Publication No 58–53525.
Patent Abstracts of Japan, Publication No. 05229378 http://www.2.ipdl.jpo–miti.go.jp/dbpweb/connector/guest/DB-Pquery/ENGDB/wdispaj.
Patent Abstracts of Japan, Publication No. 07081466 http://www.2.ipdl.jpo–miti.go.jp/dbpweb/connector/guest/DB-Pquery/ENGDB/wdispaj.
Patent Abstracts of Japan, Publication No. 10181527 http://www.2.ipdl.jpo–miti.go.jp/dbpweb/connector/guest/DB-Pquery/ENGDB/wdispaj.

* cited by examiner

*Primary Examiner*—Anthony D. Barfield
(74) *Attorney, Agent, or Firm*—MacPherson Kwok Chen & Held LLP; David S. Park

(57) ABSTRACT

Provided is an anti-submarine vehicle seat device which can reliably prevent submarining without complicating the assembling of the seat assembly, and is adapted to be retrofitted. Major parts of the device are incorporated into a subassembly which comprises a casing adapted to be attached to a seat frame, a power actuator fixedly secured in the casing, an arm pivotally supported by the casing, and adapted to be actuated by the power actuator, and a lock mechanism for keeping the arm substantially at an actuated position once the arm is actuated by the power actuator.

8 Claims, 4 Drawing Sheets

ANTI-SUBMARINE VEHICLE SEAT DEVICE

CROSS REFERENCE TO RELATED APPLICATIONS

Copending U.S. patent application Ser. No. 09/334,116 filed Jun. 15, 1999, and three commonly assigned US patent applications of even date are directed to similar subject matters, and the contents of these applications are incorporated herein by reference.

TECHNICAL FIELD

The present invention relates to a vehicle seat device, and in particular to an anti-submarine device which can be installed in a vehicle seat device to prevent a vehicle occupant from slipping forward under the seat belt in case of an impact situation such as a vehicle crash.

BACKGROUND OF THE INVENTION

It is known that the so-called submarine phenomenon may occur in an impact situation such as a vehicle crash by the vehicle occupant slipping forward under the seat belt. This is prone to occur when the occupant sits in the front end of the seat or when the back rest is tilted rearward, which reduces the effectiveness of the seat belt in restraining the vehicle occupant or prevents the desired parts of the vehicle occupant from being restrained.

Therefore, it is conceivable to raise the front end of the seat by providing a projection in a front end of the seat frame, or by installing a panel in a front end of the seat frame. However, the submarine effect may not be prevented if the projection or the panel is too low, and the comfort of the vehicle occupant may be impaired if it is too low.

It has been previously proposed to raise the front end of the seat only in case of an impact. Such proposals include those using an air bag (Japanese patent laid-open (kokai) publications No. 5-229378, No. 7-81466, and No. 3-227745), those which mechanically raise the front end of the seat (Japanese UM laid-open (kokai) publications No. 2-149328, No. 3-121947, and No. 4-93222), and those using a pyrotechnic actuator to mechanically raise the front end of the seat (Japanese UM laid-open (kokai) publication No. 3-61446).

However, because such anti-submarine vehicle seat devices involve an instantaneous generation of a large force, it is necessary to ensure a high positional accuracy of various component parts and a high level of mechanical strength. These factors contribute to increasing the complexity of assembling the seat assembly. It is also desired that the anti-submarine vehicle seat device may be retrofitted to existing seats.

BRIEF SUMMARY OF THE INVENTION

In view of such problems in previous anti-submarine devices, a primary object of the present invention is to provide an anti-submarine vehicle seat device which can reliably prevent submarining without complicating the assembling of the seat assembly.

A second object of the present invention is to provide an anti-submarine vehicle seat device which can be easily retro-fitted to an existing vehicle seat.

A third object of the present invention is to provide an anti-submarine vehicle seat device which is economical to produce but which also has adequate mechanical strength to withstand the reaction of the actuator at the time of activation.

According to the present invention, such objects can be accomplished by providing a subassembly for a vehicle seat device for raising a front part of a seat to prevent a vehicle occupant from slipping forward under a seat belt in an impact situation such as a vehicle crash, comprising: a casing adapted to be attached to a seat frame; a power actuator fixedly secured in the casing; and an arm pivotally supported by the casing, and adapted to be actuated by the power actuator.

Thus, the subassembly is adapted to be built compact, strong and economical. For instance, the casing may consist of a longitudinally elongated hollow member receiving the actuator therein, and the arm is pivotally attached to a front end of the casing so as to be rotatable around a lateral axial line. For a favorable operation of the device and compact design, the subassembly may further comprise a lock mechanism for keeping the arm substantially at an actuated position once the arm is actuated by the power actuator. Typically, the power actuator comprises a cylinder/piston assembly, and the lock mechanism is provided at an end of a cylinder of the assembly for cooperation with a piston rod extending from the end of the cylinder.

The present invention also provides a vehicle seat device for raising a front part of a seat to prevent a vehicle occupant from slipping forward under a seat belt in an impact situation such as a vehicle crash, comprising: at least one subassembly including a casing adapted to be attached to a seat frame; a power actuator fixedly secured in the casing; an arm pivotally supported by the casing and adapted to be actuated by the power actuator; and a restraint member fixedly attached to a free end of the arm so as to be moveable jointly with the arm between a retracted position and a deployed position.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
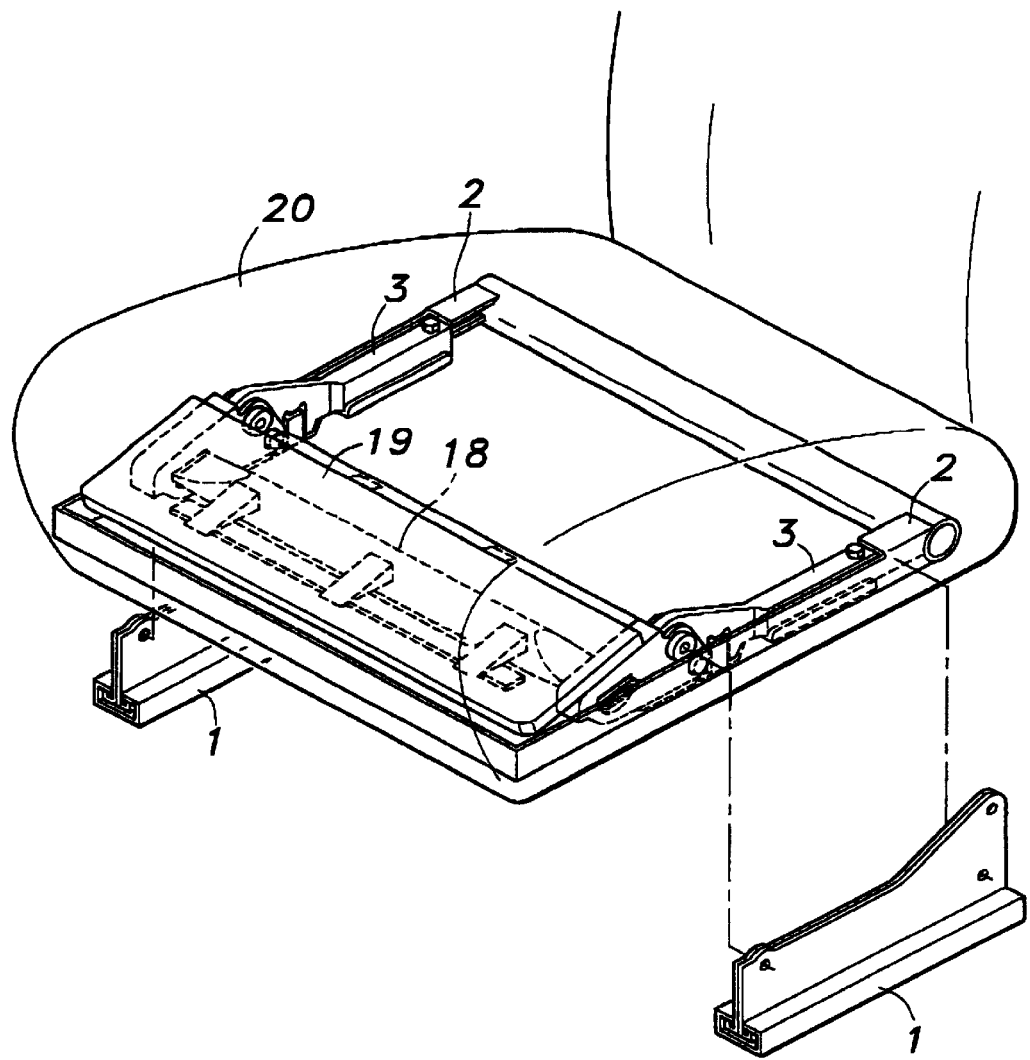
FIG. 1 is an exploded perspective view of a vehicle seat device embodying the present invention.
Figure 2:
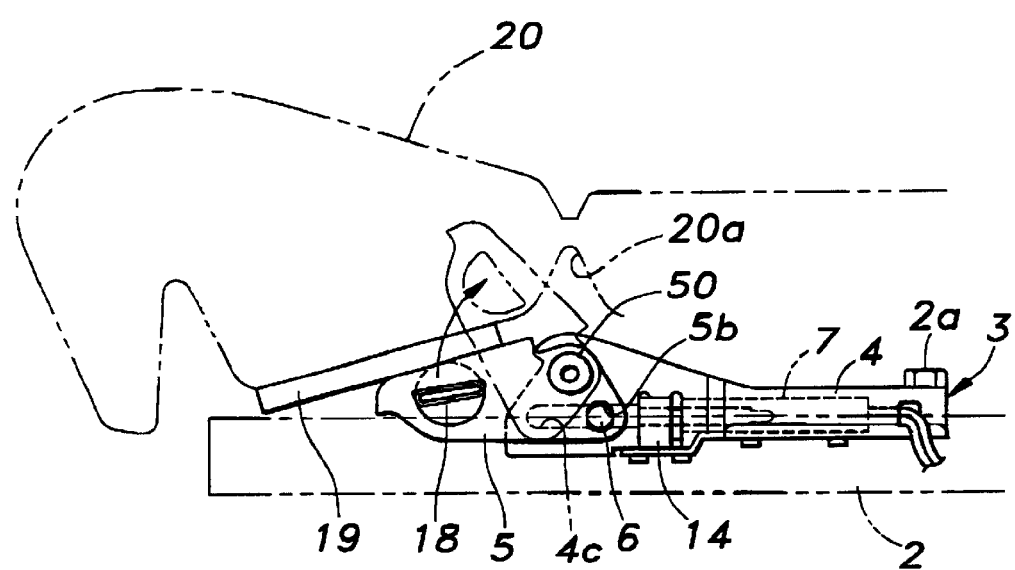
FIG. 2 is a side view of the vehicle seat device of FIG. 1.
Figure 3:
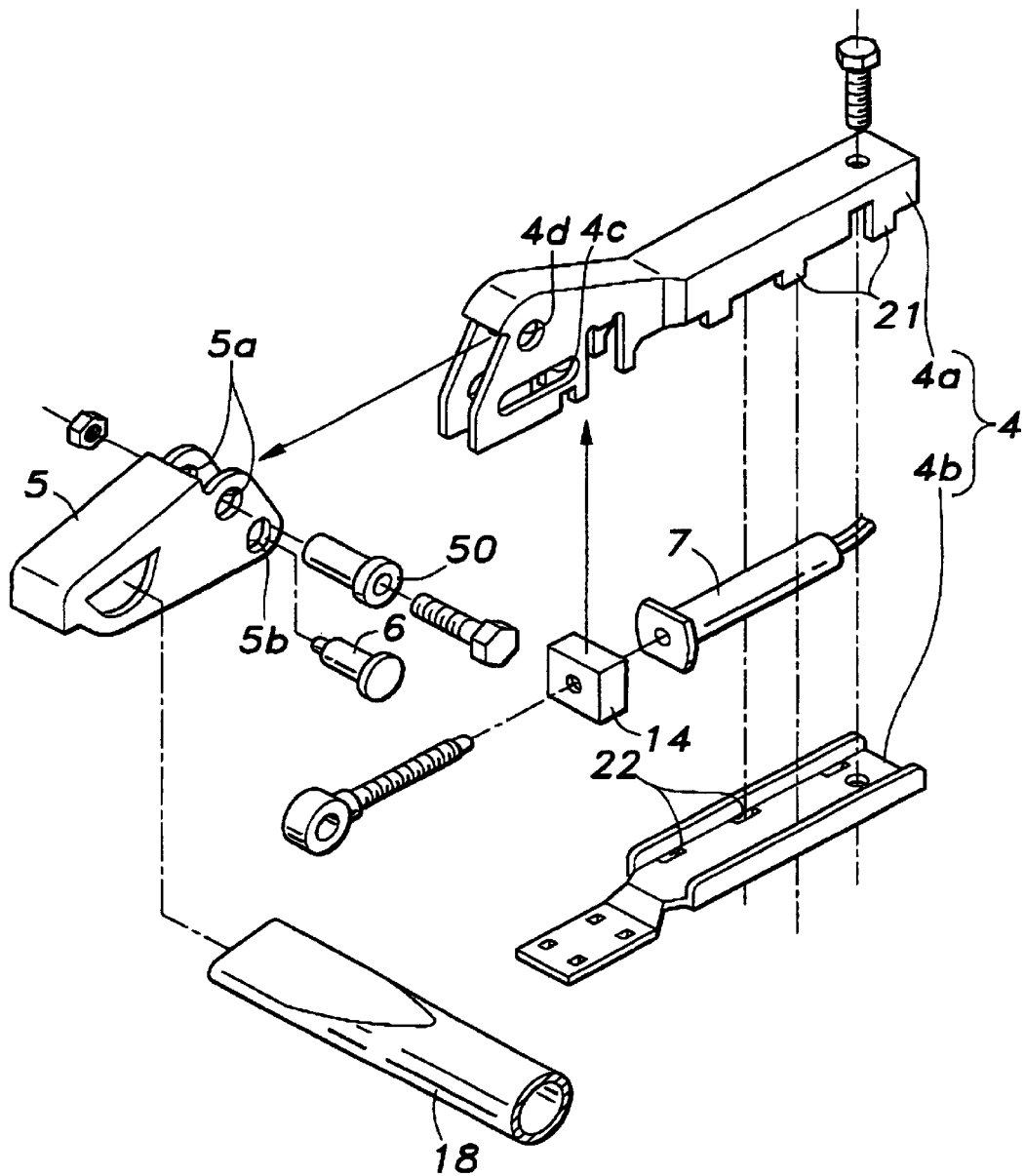
FIG. 3 is an exploded perspective view of the subassembly of the anti-submarine vehicle seat device according to the present invention.

FIG. 1 is a perspective view of a seat device embodying the present invention, and FIG. 2 is a simplified side view of this device. Seat rails 1 fixed to the vehicle body support a seat frame 2 so as to be slidable in the fore-and-aft direction via holders, and a seat adjustment mechanism not shown in the drawings allows the seat frame 2 to be secured at a desired position. The seat frame 2 is made of a stamped pan-shaped member having upright flanges along the front and both sides thereof, and the rear end of the seat frame is reinforced by a pipe member. A pair of anti-submarine seat device subassemblies 3 are attached to the inner surfaces of the upright side flanges of the seat frame 2 in a symmetric manner.

FIG. 2 shows the structure of one of the subassemblies 3. Each subassembly 3 comprises a tubular casing 4 having a rectangular cross section, an arm 5 vertically rotatable supported by the front end of the casing 4, via a pivot pin 50, so as to form a part of the restraint member, a power actuator 7 received in the casing 4 to actuate the arm 5, and a one-way lock mechanism 14 supported by the casing 4 as described hereinafter. The pivot pin 50 is passed through a pivot hole 5a provided in the arm 5 and a corresponding pivot hole 4d provided in the front end of the casing 4. The free end of the piston rod 9b of the piston assembly 9 in the power actuator 7 which is described hereinafter is connected to actuator pin 6 which is passed through a horizontally elongated guide slot 4c of the casing 4 and a vertically elongated slot 5b provided in a part of the arm 5 offset from the pivot hole 5b. Each of these subassemblies 3 can be fixedly secured to the seat frame 2 by passing threaded bolts laterally through a central opening in the pivot pin 50 and vertically through a mounting hole provided in the rear end of the casing 4.

The power actuator 7 and the one-way lock mechanism 14 are retained in the casing 4 by introducing these assemblies into the main body 4a of the casing 4 and attaching the lid portion 4b to the otherwise open bottom of the casing main body 4a. The casing main body 4a is provided with a plurality of depending tabs 21, and these tabs 21 are passed into corresponding holes 22 in the lid portion 4b to be crimped thereon. By thus entirely enveloping the power actuator 7 with the casing 4, the power actuator 7 can be kept in position during its activation without the risk of shifting and tilting inside the casing 4. If the lid portion 4b is detachably mounted, for instance by using threaded bolts, the replacement of the power actuator 7 and the one-way lock mechanism 14 is simplified for the convenience of simple repairs. If desired, the casing 4 may not entirely envelope the power actuator 7 as long as the casing 4 provides an adequate mechanical strength to withstand the reaction of the power actuator at the time of activation.

The arms 5 of the subassemblies 3 on either side are firmly connected to each other by a laterally extending pipe 18. A panel member 19 is supported by this pipe 18 and the arms 5 so that the arms 5, the pipe 18 and the panel member 19 jointly form the slip preventing member or restraint member of the anti-submarine vehicle seat device. If desired, the panel member 19 may be replaced with a wire frame to reduce the mass of the moveable part, and may even be omitted.

The anti-submarine vehicle seat device is thus formed by the two subassemblies 3 on either side, the restraint member consisting of the arms 5, the pipe 18 and the panel member 19, the impact sensor consisting of an acceleration sensor or the like (not shown in the drawing), and a control unit (not shown in the drawing) for activating the actuator according to an input from the impact sensor.

This anti-submarine vehicle seat device may be installed in a seat during the assembly work or may be retrofitted to an existing seat. When installing the device in a seat during the assembly work, and welding is required to be performed, the subassemblies 3 each fitted with the power actuator 7 incorporated with a propellant may be installed after completing the welding process. The seat frame 2 was supported by the seat rails 1 via the slidable holders in the above described embodiment, but may be attached to mounting brackets in case of a tiltable and/or liftable seat.

Figure 4:
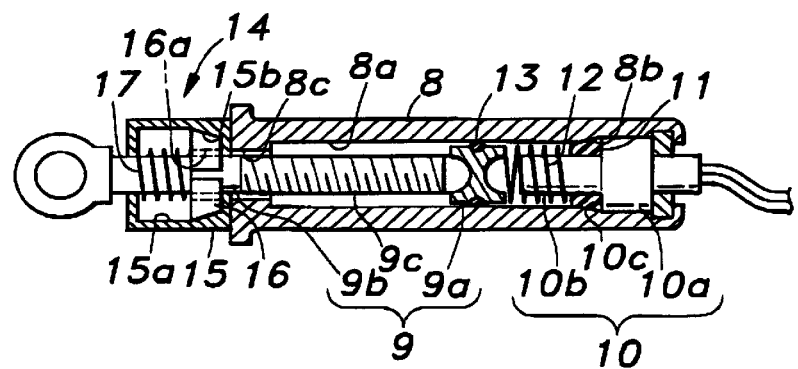
FIG. 4 is a sectional view of the power actuator which is incorporated in the subassembly.

Referring to FIG. 4, the power actuator 7 comprises a cylinder 8, a piston main body 9a received in an inner bore 8a of the cylinder 8, and a gas generator 10 received in the part of the cylinder 8 more toward the base end thereof than the piston main body 9a. A compression coil spring 12 is interposed between the piston main body 9a and the gas generator 10 via a resilient annular seal member 11 to normally urge the piston main body 9a in the direction of activation (projecting direction). The seal member 11 may consist of any suitable kind such as an O-ring which has a resiliency in the axial direction, and is effective in preventing the leakage of generated gas.

The gas generator 10 comprises a large diameter portion 10a on the base end thereof, and a small diameter portion 10b on the front end thereof, and a shoulder 10c defined between these portions engages a corresponding shoulder 8b defined in the cylinder 8 to properly position the gas generator 10 in the cylinder 8. The shoulder 10c of the gas generator 10 additionally serves as a seat for the compression coil spring 12 via the seal member 11. The compression coil spring 12 surrounds the small diameter portion 10b on the front end of the gas generator 10 in such a manner that a gap may be defined between the piston main body 9a and the front end of the small diameter portion 10b even when the compression coil spring 12 is fully compressed. Therefore, even when the piston main body 9a is subjected to an external force which would force it toward the gas generator 10, the piston main body 9a would not hit the front end of the small diameter portion 10b on the front end of the gas generator 10 so that the gas generator 10 is protected from damage and deformation.

The piston main body 9a engages the wall surface of the inner bore 8a via an O-ring 13. The piston assembly 9 is formed by the piston main body 9a and a piston rod 9b, which abuts the piston main body 9a from the axial direction and is provided with a free end attached to the arm 5. The piston main body 9a and the piston rod 9b engage each other via a contact between a concentrically curved recess, and a corresponding concentrically curved projection having a somewhat smaller curvature so that the two parts are automatically aligned and the piston rod 9b will not tilt in the cylinder. The recess and the projection may be provided with appropriately cooperating spherical surfaces. Therefore, energy loss and gas leakage can be avoided. In practice, the surfaces are not necessarily required to be curved, but may also consist of tapered surfaces. In that case, the taper of the projection should be steeper than the taper of the recess.

As described earlier, the compression coil spring 12 normally urges the piston main body 9a in the direction of activation so that the piston rod 9b is also urged in the direction of activation, and the play that may be present in the joint between the piston rod 9b and the arm 5 may be absorbed. The compression coil spring may be substituted with a dish spring or a rubber-like elastomer member.

The open end 8c of the cylinder 8 on the working end is reduced in diameter by swaging so as to slidably engage the outer circumferential surface of the intermediate part of the piston rod 9b.

The front end of the power actuator 7 is provided with the one-way lock mechanism 14. The one-way lock mechanism 14 comprises a casing 15 surrounding the piston assembly 9 and fixedly attached to the casing 4 or the cylinder 8. Casing 15 accommodates therein a plurality of engagement pieces 16 surrounding the piston assembly 9, and a spring 17 urging the engagement pieces 16 toward the base end of the piston assembly 9 or the cylinder 8. Each of the engagement pieces 16 is gradually reduced in outer diameter from the free end of the piston assembly 9 to the base end thereof. The inner bore of the casing 15 includes a large diameter portion 15a and a tapered portion 15b which is gradually reduced in inner diameter away from the large diameter portion 15a.

Therefore, in the illustrated state, the engagement pieces 16 are pressed onto the tapered portion 15b and engage the outer circumferential surface of the piston assembly 9 under the biasing force of the spring 17. As the piston assembly 9 moves in the projection direction, the engagement pieces 16 are dragged in the projecting direction of the piston assembly 9 against the spring force of the spring 17. As they move toward the large diameter portion 15a, they move away from the piston assembly 9 so that the piston assembly 9 is allowed to move freely. When the piston assembly 9 is pushed back into the cylinder 8, the engagement pieces 16 move toward the tapered portion 15b under the spring force of the spring 17 and engage the outer circumferential surface of the piston assembly 9 so that the piston assembly 9 is securely fixed relative to the cylinder 8. The inner circumferential surface of each of the engagement pieces 16 is provided with annular grooves or thread grooves while the outer circumferential surface of the piston rod 9b is provided with corresponding annular grooves or thread grooves. Therefore, as the piston assembly 9 is pushed into the cylinder 8, the inner circumferential surfaces of the engagement pieces 16 engage the outer circumferential surface of the piston assembly 9 so that these two parts are firmly retained to each other, and are kept at a fixed position.

The mode of operation of this embodiment is described in the following. First of all, when a vehicle crash is detected by a deceleration sensor not shown in the drawing, gas is generated from the gas generator 10, and the resulting rapid increase in the inner pressure of the cylinder 8 instantaneously pushes out the free end of the piston rod 9b from the cylinder 8. As a result, the arm 5 attached to the free end of the piston rod 9b turns in a clockwise direction as indicated by the imaginary lines in FIG. 2, and the slip preventing member consisting of the pipe 18 and the panel member 19 is raised along with the corresponding part of the seat so that the submarining of the vehicle occupant can be prevented. Because an intermediate part of the seat cushion 20 has a relative small thickness or is provided with a notch 20a, the seat cushion 20 would not excessively resist the lifting of the seat by the slip preventing member. In practice, it is also possible to form the part of the seat that can be raised by the slip preventing member from a separate member. Further, by providing a resiliency to a selected part of the surface skin member of the seat as required, the resistance to the raising motion of the seat can be appropriately controlled.

Because the vehicle operator is typically stepping on the brake pedal immediately before a vehicle crash, the vehicle operator tends to sustain an injury in his or her legs. However, because the anti-submarine vehicle seat device raises the legs of the vehicle operator immediately before impact, the possibility of a leg injury can be reduced.

Even after the generation of gas from the gas generator 10 has ceased, and the drive force of the power actuator 7 has been lost, the raised slip preventing member does not come down but maintains the action to prevent submarining.

Two identically constructed one-way lock mechanisms were arranged on either side in the above described embodiment, but there may be only one one-way lock mechanism, or two different one-way lock mechanisms may be arranged on either side. For instance, the above described one-way lock mechanism may be provided on one side while a ball-type one-way lock mechanism capable of locking at any desire position is provided on the other side. Each of the power actuators consisted of a relatively small device because two of them were used on either side in the above described embodiment, but it is also possible to provide only one power actuator on one side of the seat depending on the structure of the vehicle.

By separately providing the pipe 18 and the panel member 19, it is possible to adapt the assembly to a frame having a different cushion width simply by changing the length of the pipe. The tuning necessary for achieving a desired energy absorbing property which fits the particular deceleration property of the vehicle can be accomplished simply by changing the material, shape, size and position of the pipe and panel member. A further cost reduction can be achieved if the pipe is replaced with a stamped sheet metal member so as to simplify the manufacturing process.

Figure 5:
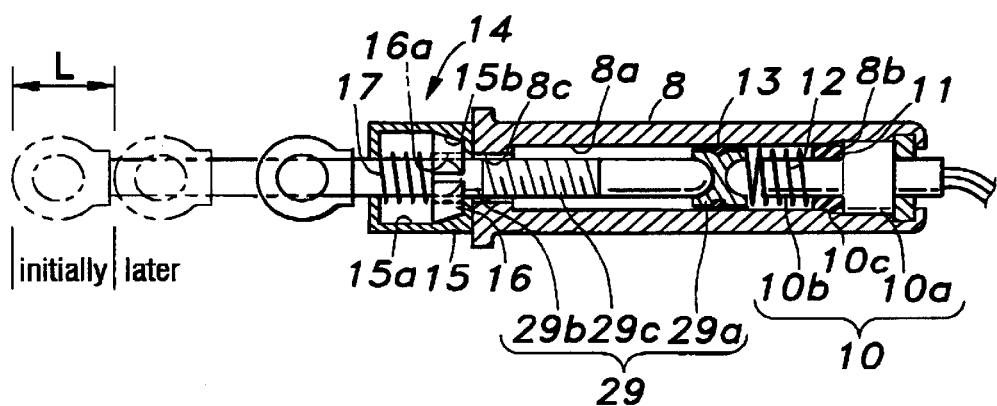
FIG. 5 is a view showing a modified embodiment of the vehicle seat device of the present invention.

FIG. 5 is a view similar to FIG. 4 showing a modified embodiment of the vehicle seat device according to the present invention, and the parts corresponding to those of FIG. 4 are denoted with like numerals without repeating the description of such parts. The drawing shows the state when the anti-submarine vehicle seat device has been activated. In this case, the length of the area provided with the annular grooves or thread grooves on the outer circumferential surface of the piston rod 29b of the piston assembly 29 is somewhat reduced from that of the previous embodiment. In other words, after the piston assembly 29 has been fully pushed out, it recedes by a distance indicated by L, and is retained at this position by the engagement between the inner circumferential surfaces of the engagement pieces 16 and the outer circumferential surface of the piston rod 29b. Therefore, according to this embodiment, upon experiencing an impact, the legs of the vehicle occupant are initially raised, but with the disappearance of the drive force of the power actuator 7, they are brought back slightly or only partly toward their original position. Numeral 29a denotes the piston main body.

As noted above, it is desirable to substantially raise the leg away from the pedal by the activation of the anti-submarine vehicle seat device in the initial phase of the vehicle crash. However, during the subsequent intermediate phase, because the vehicle occupant moves forward, keeping the legs in an excessively raised position may increase the load on the pelvis of the vehicle occupant. According to the above described arrangement, the anti-submarine vehicle seat device significantly raises the legs of the vehicle occupant away from the pedal during an early phase of a vehicle crash, and then lowers the legs to a small extent that is required to prevent submarining during an intermediate phase of the vehicle crash so that the load on the pelvis of the vehicle occupant may be kept at a proper level.

The anti-submarine vehicle seat device of the present invention can be adapted for different kinds and sizes of vehicles and positions of seats. For instance, when the panel member is provided substantially over the entire length of the pipe 18, and the central part of the panel member projects higher than the remaining part of the panel member, the legs of the vehicle occupant can be raised while keeping them wide apart in case of a vehicle crash so that the interference with the steering handle can be avoided. Alternatively, when the central part of the panel member is more recessed than the remaining part of the panel member, the legs of the vehicle occupant can be raised while keeping them close together in case of a vehicle crash so that the interference with the door can be avoided particularly in a single passenger vehicle.

Further, if the panel member is provided only over one half the length of the pipe 18 on the outer side of the pipe, it is possible to positively raise the leg which is positioned on the outside, and which is relatively stretched for stepping on the pedal, and protect this leg particularly in the case of an offset crash which causes a relatively large deformation on the associated side part of the vehicle body. In this case, to facilitate the lifting motion of the seat member, the front part of the seat member may be separated into two parts disposed one next to the other laterally, and each part may be provided with a notch which serves as a hinge for the upward movement of the corresponding part.

If the panel member is inclined upward from inside to outside, it is possible to raise the outer leg of the vehicle occupant both upward and inward. Conversely, if the panel member is inclined downward from inside to outside, the interference with the steering handle can be avoided. Furthermore, when the panel member is provided only over one half the length of the pipe, because the lifting area is smaller than having the panel member extend over the entire length of the pipe, the force required to raise the panel member is substantially reduced so that the required size of the power actuator can be reduced, and the component parts may have smaller thicknesses and masses.

As can be appreciated from the foregoing description, according to a certain aspect of the present invention, the anti-submarine vehicle seat device for raising a seat cushion to prevent a vehicle occupant from slipping forward under a seat belt in an impact situation such as a vehicle crash, comprises a casing fixedly attached to a seat frame, a slip preventing member moveably supported by the casing, a power actuator supported by the casing for driving the slip preventing member, and a locking-mechanism supported by the casing to keep the slip preventing member at a position for keeping the seat cushion in its raised position. The power actuator, a part of the slip preventing member, and the locking mechanism are installed in the casing as a subassembly so that the assembly and positioning of the various component parts are simplified, and the device is adaptable for a retrofit to an existing seat.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle seat device for raising a front part of a seat to prevent a vehicle occupant from slipping forward under a seat belt in an impact situation such as vehicle crash, comprising:
   at least one subassembly including a casing adapted to be attached to a seat frame, said casing including a longitudinally elongated hollow member, a power actuator fixedly secured in said hollow member, and an arm pivotally supported by said casing and adapted to be actuated by said power actuator; and
   a restraint member fixedly attached to a free end of said arm so as to be moveable jointly with said arm between a retracted position and a deployed position.

2. A vehicle seat device according to claim 1, wherein said subassembly is provided on each side of the seat, and said restraint member is connected between the free ends of the arms of said subassemblies.

3. A vehicle seat device according to claim 1, wherein said subassembly is attached to an inner surface of an upright side flange of said seat frame.

4. A vehicle seat device according to claim 1, wherein said subassembly is provided on each side of said seat frame.

5. A vehicle seat device according to claim 1, wherein said subassembly is provided only on one side of said seat frame.

6. A subassembly for a vehicle seat device for raising a front part of a seat to prevent a vehicle occupant from slipping forward under a seat belt in an impact situation such as a vehicle crash, comprising:
   a casing adapted to be attached to a seat frame, said casing including a longitudinally elongated hollow member, and wherein said casing is formed by a casing main body having an open bottom and a lid portion closing said open bottom;
   a power actuator fixedly secured in said hollow member; and
   an arm pivotally supported by said casing, and adapted to be actuated by said power actuator.

7. A subassembly for a vehicle seat device for raising a front part of a seat to prevent a vehicle occupant from slipping forward under a seat belt in an impact situation such as a vehicle crash, comprising:
   a casing adapted to be attached to a seat frame, said casing including a longitudinally elongated hollow member;
   a power actuator fixedly secured in said hollow member, wherein said power actuator comprises a piston/cylinder assembly which is powered by a propellant; and
   an arm pivotally supported by said casing, and adapted to be actuated by said power actuator, wherein said arm is pivotally supported by a pivot pin passed laterally across a front end of said casing and a base end of said arm, and wherein a front end of said casing is provided with a longitudinally elongated guide slot, and said arm is provided with a vertically elongated slot at a part thereof offset from said pivot pin, an actuator pin being passed through said slots, a working end of said piston/cylinder assembly being connected to said actuator pin while said piston/cylinder assembly is retained in said casing.

8. A subassembly for a vehicle seat device for raising a front part of a seat to prevent a vehicle occupant from slipping forward under a seat belt in an impact situation such as a vehicle crash, comprising:
   a casing adapted to be attached to a seat frame, said casing including a longitudinally elongated hollow member;
   a power actuator fixedly secured in said hollow member; and
   an arm pivotally supported by said casing, and adapted to be actuated by said power actuator, wherein said arm is pivotally supported by a pivot pin passed laterally across a front end of said casing and a base end of said arm, and wherein said pivot pin consists of a hollow pin which is adapted to receive a mounting bolt for attaching said casing to said seat frame.

* * * * *